United States Patent [19]

Cavallino et al.

[11] 4,250,707

[45] Feb. 17, 1981

[54] EXHAUST EMISSION CONTROL SYSTEM FOR INTERNAL COMBUSTION ENGINES

[75] Inventors: Francesco Cavallino, Pinerolo; Pasquale Martinez, Turin; Stefano Vaccaneo, Turin; Michele Allione, Turin, all of Italy

[73] Assignee: Fiat Auto S.p.A., Turin, Italy

[21] Appl. No.: 970,075

[22] Filed: Dec. 14, 1978

[30] Foreign Application Priority Data

Dec. 23, 1977 [IT] Italy .................. 69897 A/77

[51] Int. Cl.³ .................. F02M 23/10; F01N 3/10
[52] U.S. Cl. .................. 60/293; 123/409; 123/424; 123/587; 123/588
[58] Field of Search .................. 60/278, 293; 261/34 B, 261/69 R; 123/117 A, 119 A, 124 R, 124 A, 124 B, 119 D

[56] References Cited

U.S. PATENT DOCUMENTS

| | | | |
|---|---|---|---|
| 3,706,444 | 12/1972 | Masaki | 261/69 R |
| 3,857,373 | 12/1974 | Martin | 123/117 A |
| 3,977,380 | 8/1976 | Atsumi | 123/124 A |
| 3,983,189 | 9/1976 | Taylor | 261/69 R |
| 3,992,878 | 11/1976 | Moorman | 60/278 |
| 4,027,478 | 6/1977 | Masaki | 60/290 |
| 4,098,241 | 7/1978 | Tateno | 123/124 A |
| 4,106,464 | 8/1978 | Yamashita | 123/124 A |

Primary Examiner—Michael Koczo, Jr.
Attorney, Agent, or Firm—Sughrue, Rothwell, Mion, Zinn & Macpeak

[57] ABSTRACT

An exhaust emission control system for a spark ignition internal combustion engine comprises a first pressure sensitive valve for recycling a proportion of the exhaust gases from the exhaust to the induction when the engine is warm, being inhibited when the engine is cold, valves for admitting a small amount of fresh air to the exhaust manifold, a second pressure sensitive valve for admitting fresh air to the induction manifold downstream of the carburettor when the engine is warm, being closed when the engine is cold and when the starter motor is energized, a first fuel/air mixture enrichment valve in the carburettor sensitive to induction manifold pressure and de-sensitized when the engine is cold, a second fuel/air mixture enrichment valve sensitive to induction manifold pressure and de-sensitized when the engine is hot, and a vacuum advance delay which is by-passed when the engine is warm.

5 Claims, 1 Drawing Figure

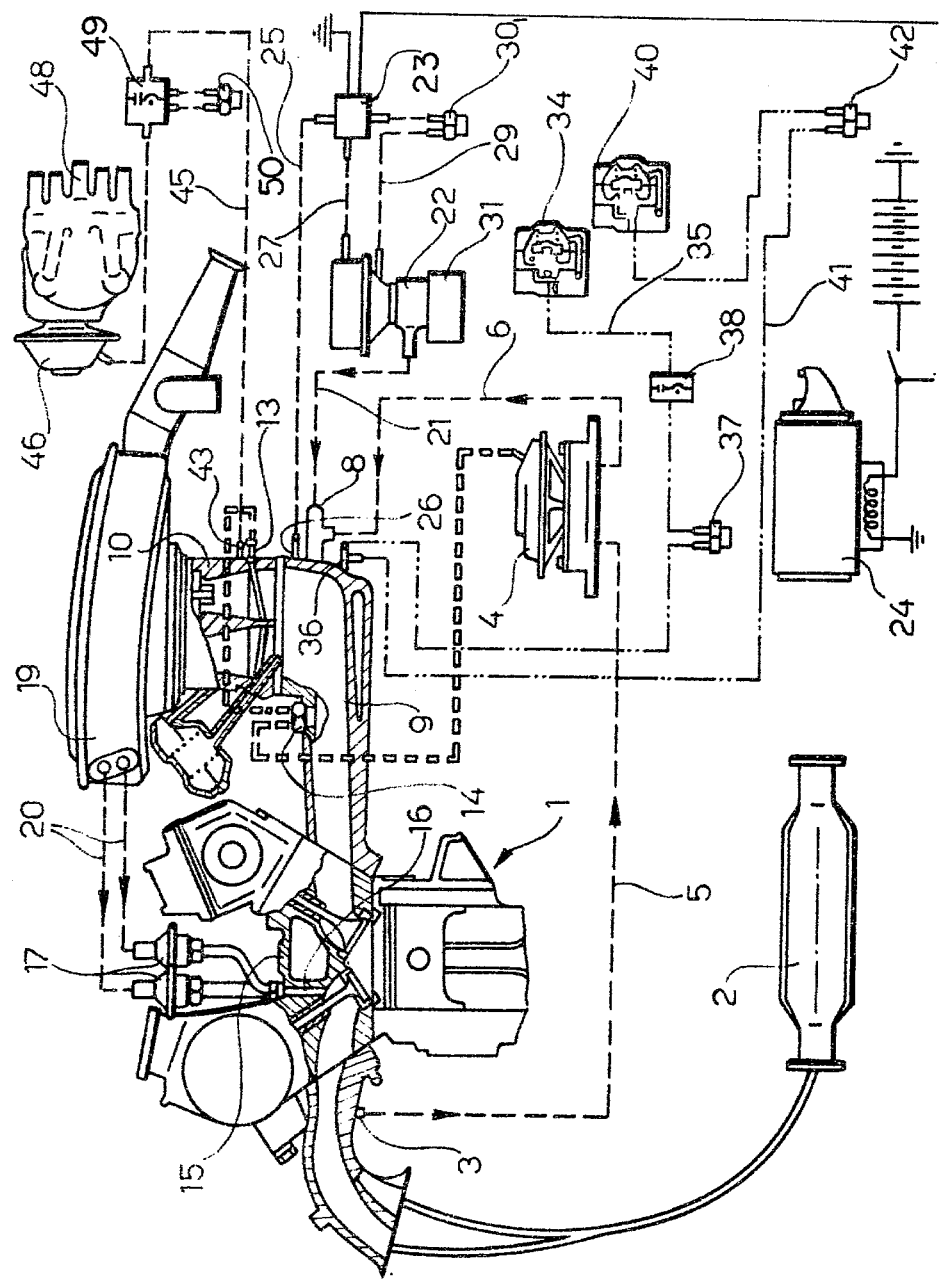

EXHAUST EMISSION CONTROL SYSTEM FOR INTERNAL COMBUSTION ENGINES

BACKGROUND OF THE INVENTION

The fight against atmospheric pollution has resulted, in many countries, in the passing of laws which require automobiles with internal combustion engines to employ various ancillary devices for the purpose of reducing as far as possible, the emission of noxious gases. Such devices do not always have a beneficial effect on the fuel consumption of the engine, but fuel economy is very important and is sought by most automobile manufacturers. In general the twin objects of reducing the emission of pollutants and increasing fuel economy (by reducing fuel consumption) are attained in the first place by effecting after burning of the exhaust gases by mixing into them further combustion air for completing, as far as possible, the combustion of the carbon monoxide and the unburnt hydrocarbons, in the second place by the addition to the incoming fuel/air mixture in the induction side of the engine a small proportion of the hot exhaust gases in order to reduce the formation of nitrogen oxides, and in the third place by means of the suitable metering of the fuel/air mixture in such a way that the engine always functions with optimal carburation.

However, internal combustion engines frequently experience transient operating conditions in which the above mentioned measures, such as for example the after burning of exhaust gases, can be damaging to the engine, especially its exhaust system inasmuch as it produces local overheating. Such conditions occur when the engine is hot, for example upon hard acceleration with the throttle wide open and on overrun when the throttle is closed; when the engine is cold, particularly immediately upon starting, such conditions can also arise. In all these cases, in fact, the engine is supplied with a very rich mixture the result of which is an increase in the unburnt hydrocarbons in the exhaust gases and consequently, upon afterburning, very high temperatures which can be damaging to the exhaust system.

OBJECTS OF THE INVENTION

The primary object of the present invention is to provide an emission control system for internal combustion engines which permits the greatest possible reduction in the emission of noxious gases into the atmosphere.

Another object of the invention is to provide an emission control system which, while achieving said primary object, at the same time permits the engine always to have, whatever its operating conditions, a correct metering of fuel/air mixture.

Another object of the invention is to provide an emission control system which is particularly suitable for automobile engines and includes means for effecting afterburning of the exhaust gases and means for recycling a proportion of the exhaust gases.

A further object of the invention is to provide an exhaust emission control system for internal combustion engines which can operate at values which are appropriate for the engine requirements whether the engine has just started from cold and has not yet completed its warm up, or whether it has been running for some time and has attained its normal operating temperature.

SUMMARY OF THE INVENTION

According to the present invention there is provided in an exhaust emission control system including; means for withdrawing a proportion of the exhaust gases from the exhaust manifold at a point corresponding to at least one cylinder and for recycling said exhaust gases to the carburettor, and means for admitting additional air directly into the exhaust manifold for the further combustion of any incompletely burnt fuel present in the exhaust gases in the exhaust system of said engine, the improvement wherein, said exhaust gas recycling means includes temperature sensitive valve means connected in circuit therewith, said temperature sensitive valve means being sensitive to the operating temperature of said engine and operating to prevent opening of said exhaust gas recycling valve means to effect recycling of exhaust gas except when the engine has attained a predetermined operating temperature, further valve means connected to a point in the induction manifold of said engine downstream from the carburettor butterfly valve, said further valve means including, means sensitive to the vacuum in said induction manifold said further valve means operating to admit additional air to said induction manifold when said vacuum sensitive means thereof detects that the pressure in said induction manifold is below a threshold value, and temperature sensitive valve means operating to inhibit the admission of said additional air when the temperature of said engine is below a predetermined threshold value, and control valve means connected in circuit with said further valve means, said control valve means being sensitive to energisation of the starter motor of said engine and operating to close said further valve means when said starter motor is energised, whereby to prevent the admission of said additional air to said induction manifold when said engine is being started and thus to avoid the occurrence of explosions in the exhaust system due to said additional air.

The invention will be better understood and other characteristics will become clear from the following description, in which reference will be made to the attached drawing, provided purely by way of non-limitative example.

BRIEF DESCRIPTION OF THE DRAWING

The single FIGURE of the drawing is a schematic diagram illustrating a system according to the invention applied to a spark ignition internal combustion engine having four cylinders.

DESCRIPTION OF THE PREFERRED EMBODIMENT

In the drawings there is shown a four cylinder internal combustion engine generally indicated 1, the exhaust system of which is provided with a catalytic silencer 2 of the oxidising and insulated type.

On the branch of the exhaust manifold leading from the first cylinder there is situated an exhaust gas take off point 3 forming part of an exhaust gas recycling system which includes a pneumatic valve 4, commonly termed an EGR valve, which is connected by a duct 5 to the said take-off point 3 and by a duct 6 to an inlet 8 on the induction manifold 9 situated at a point downstream from a double body carburettor 10. This pneumatic valve 4 is controlled by a vacuum signal in a duct 12 which is shown as a broken double line. The duct 12 communicates, via a heat sensitive valve 14, with the interior of the carburettor through a communication hole 13 in the first carburettor body located at a point just upstream of the butterfly thereof. The pneumatic valve 4 is of a type the operation of which depends not only on the change of the vacuum signal in the duct 12, but also on the value of the back pressure existing in the exhaust manifold at the take-off point 3 to which it is connected by said duct 5.

The heat sensitive valve 14 is of known type, and is located in series in the duct 12. Although shown in the drawing located next to the carburettor it would in practice be positioned to sense the temperature of the coolant liquid of the engine; in operation the valve 14 inhibits the operation of the pneumatic valve 4 until the engine has achieved a certain threshold temperature by remaining closed until this threshold temperature has been reached.

In the cylinder head 15 of the engine 1 there are formed three passages 16 opening out into the branches of the exhaust manifold leading from the second, third and fourth cylinders. In these passages are connected two automatic pulsing valves 17, of a type commonly known as "reed" valves, one serving the second and third cylinders and the other serving the fourth cylinder; these valves operate to draw off fresh air from air filter 19 of the induction system by means of a duct 20, and to feed it into the exhaust manifold for the purpose of causing after burning of that part of the exhaust gas which flows unburnt from the combustion chambers of the engine in order to reduce the emission of noxious gases.

To the inlet 8 in the induction manifold 9 there is also connected, by means of a duct 21 a pneumatic valve 22, of a known type, termed a "gulp" valve, which forms part of a device for eliminating explosions (backfiring) in the exhaust system. The gulp valve 22 has a valve shutter operated by a diaphragm separating upper and lower chambers thereof. Communication with each of these chambers separately is achieved via respective upper and lower communication ports. This device is composed of a three way two position solenoid valve 23 controlled by the starter motor 24. One of the three ports of this valve is connected by means of a duct 25 to a communication hole 26 in the induction manifold at a point just downstream from the butterfly valve of the carburettor, a second port of the valve 23 is connected to a duct 27 leading to the upper port of the "gulp" valve. The lower chamber of the gulp valve in its turn is connected by means of a duct 29 to the third port of the solenoid valve. In the duct 29 is inserted a heat sensitive valve 30 which is sensitive to variations in the temperature of the coolant liquid of the engine and is closed when the engine is cold, opening when a certain threshold temperature has been reached. The gulp valve 22 is also provided with an aperture communicating with the atmosphere by means of an air filter 31.

The operation of the device for eliminating backfiring described above is as follows:

The pneumatic gulp valve 22 upon deceleration of the engine, when there is complete closure of the butterfly valve of the carburettor, senses the vacuum in the induction manifold via the duct 25, the valve 23, the heat sensitive valve 30 and the duct 29, and normally (that is when the engine is warm) opens to allow the intake of a certain quantity of air into the manifold itself through the duct 21 during such deceleration. This function is impeded, however, when the motor is cold, by the heat sensitive valve 30 which is closed to interrupt communication between the duct 29 leading from the lower chamber of the gulp valve 22 to the solenoid valve 23 until the temperature of the engine coolant, to which the valve 30 is sensitive, reaches the said certain threshold value. When the engine is being turned by the starter motor, the solenoid valve 23 receives an electrical signal which switches it to connect the duct 25 and the duct 27 so that the control vacuum is now applied to the upper chamber of the gulp valve 22 and consequently the membrane of the gulp valve 22 is displaced upwardly to move the shutter attached thereto securely to its closed position so that the intake of air into the pneumatic valve 22 and therefore into the induction manifold 9 is stopped even when the engine is warm when starting. This prevents the occurrence of small explosions (backfiring) in the exhaust upon starting whilst nevertheless allowing the normal inlet of air into the induction manifold during overrun conditions when the engine is hot whereby to reduce the emission of carbon monoxide during deceleration of the automobile.

The carburettor 10 is further provided with a pneumatic valve 34 (shown separated from the carburettor in the drawing) which forms part of a "power valve" system. The pneumatic valve 34 is connected by means of a duct 35 to a communication hole 36 formed in the wall of the induction manifold downstream from the butterfly of the carburettor. In series in the duct 35 are a heat sensitive valve 37 sensitive to the temperature of the coolant liquid of the engine which is closed when the coolant is cold, and a pneumatic "delay" valve 38 of known type. The power valve system operates as follows:-

The pneumatic valve 34 is de-activated when the vacuum in the induction manifold is above a predetermined threshold and activated when the vacuum falls below this threshold; when so activated, the valve 34 operates to enrich the fuel/air mixture supplied by the carburettor. The heat sensitive valve 37 is closed when the engine coolant is below a predetermined threshold value and thus prevents activation of the pneumatic valve until the temperature of the coolant liquid has attained the said predetermined threshold, so that the pneumatic valve cannot supply enrichment fuel whatever the conditions of operation and therefore of vacuum of the engine when cold.

The "delay" valve has the function of retarding, for a predetermined time, the activation of the pneumatic valve during acceleration when the heat sensitive valve is open, and therefore retards the enrichment of the mixture, which permits the improvement of the fuel consumption and of the exhaust gas emission during acceleration.

In addition to the pneumatic valve 34 of the power valve system, the carburettor also incorporates a second pneumatic valve 40 (also shown separately from the carburettor) which is a secondary recovery valve connected by means of a duct 41 to the communication passage 36 formed in the wall of the induction manifold. In the duct 41 is located, in series, a further heat sensitive valve 42 which is open when the motor is cold and sensitive to the temperature of the coolant liquid of the engine. The pneumatic valve 40 opens to pass supplementary fuel when there is a strong variation in the vacuum in the induction manifold whilst the motor is still cold, that is until the engine coolant has reached a predetermined threshold. When the motor is hot the heat sensitive valve 42 is closed and the pneumatic valve is isolated from its control signal.

Upstream from the butterfly of the carburettor 10 there is a hole 43 which is connected by means of a duct 45 with a pneumatic ignition timing advance capsule 46 which controls the automatic advance and retard of the ignition timing of the distributor 48 in dependence on the vacuum in the induction manifold. A further delay valve 49 is located in series in the duct 45 and connected to it, to operate as a bypass, is a heat sensitive valve 50 sensitive to the variations in temperature of the coolant liquid of the engine. The pneumatic capsule 46 receives a vacuum signal to advance or retard the ignition timing in dependence on the vacuum signal from the carburettor. When the engine is cold, however, this vacuum signal is temporarily held up by the delay valve and therefore allows, in effect, a supplementary advance during acceleration when the engine is cold, thereby improving fuel consumption in these conditions.

When the motor warms up the delay valve is by-passed upon the opening of the previously closed heat sensitive valve, following which the operation of the automatic timing advance mechanism remains tied only to the variation of the control vacuum.

The air filter 19 is provided with a double intake sleeve which collects both hot air and cold air; within the filter 19 is positioned a thermostat (not shown) which controls the proportioning of hot and cold air to maintain a constant temperature, as far as this is possible, in the air fed to the carburettor.

It is to be understood that all the heat sensitive valves which are shown separated in the drawing would be conveniently regrouped in a central console upon assembly, in contact with the coolant liquid of the motor.

What we claim is:

1. In a spark ignition internal combustion engine having an exhaust emission control system including;
   means for withdrawing a proportion of the exhaust gases from the exhaust manifold at a point corresponding to at least one cylinder and for recycling said exhaust gases to the carburetor, and
   means for admitting additional air directly into the exhaust manifold for the further combustion of any incompletely burnt fuel present in the exhaust gases in the exhaust system of said engine,
   the improvement wherein,
   said exhaust gas recycling means includes temperature sensitive valve means connected in circuit therewith, said temperature sensitive valve means being sensitive to the operating temperature of said engine and operating to prevent opening of said exhaust gas recycling valve means to effect recycling of exhaust gas except when the engine has attained a predetermined operating temperature,
   further valve means connected to a point in the induction manifold of said engine downstream from the carburetor butterfly valve, said further valve means including,
   means sensitive to the vacuum in said induction manifold, said further valve means operating to admit additional air to said induction manifold when said vacuum sensitive means thereof detects that the pressure in said induction manifold is below a threshold value, and
   temperature sensitive valve means operating to inhibit the admission of said additional air when the temperature of said engine is below a predetermined threshold value,
   control valve means connected in circuit with said further valve means, said control valve means being sensitive to energization of the starter motor of said engine and operating to close said further valve means when said starter motor is energized, whereby to prevent the admission of said additional air to said induction manifold when said engine is being started and thus to avoid the occurrence of explosions in the exhaust system due to said additional air, said carburetor being provided with a first pneumatic sensitive valve,
   a control input to said first pneumatic pressure sensitive valve,
   a duct connecting said control input to a third point on said induction manifold,
   a temperature sensitive valve in said duct, said temperature sensitive valve operating to close communication between said control input and said induction manifold when the operating temperature of said engine is below a predetermined threshold thereby inhibiting operation of said valve, and
   pneumatic delay means connected in series in said duct, said first pneumatic pressure sensitive valve operating to enrich the mixture supplied by said carburetor, when said engine operating temperature is above said predetermined threshold, with a delay, determined by said pneumatic delay means, after said control input of said valve senses a fall in the pressure in said induction manifold.

2. The exhaust emission control system of claim 1, wherein said exhaust gas recycling valve means has an inlet port, an outlet port and a control port, a
   first duct connecting said inlet port of said exhaust gas recycling valve means to said exhaust manifold of said engine,
   a second duct connecting said outlet port of said exhaust gas recycling valve means to a first point on said induction manifold,
   a third duct connecting said control port of said exhaust gas recycling means to a second point on said induction manifold, said temperature sensitive valve means being connected in series in said third duct,
   said exhaust gas recycling valve means operating to open communication between said inlet and outlet ports thereof in dependence on the pressure difference between said inlet port and said control port thereof and being prevented from opening when said temperature sensitive valve means is closed to interrupt communication between said control port and the induction manifold of said engine.

3. The exhaust emission control system of claim 2, wherein said second point on said induction manifold is upstream of the carburettor butterfly valve and said first point on said induction manifold is downstream of said carburettor butterfly valve.

4. The exhaust emission control system of claim 1, wherein said carburettor is provided with a second pneumatic pressure sensitive valve,
   a control input to said second pneumatic pressure sensitive valve,
   a duct connecting said control input to said third point on said induction manifold,
   a temperature sensitive valve in said duct, said temperature sensitive valve operating to close communication between said control input and said induction manifold when the operating temperature is above a predetermined threshold, whereby to inhibit operation of said second pneumatic pressure sensitive valve, said second pneumatic pressure sensitive valve operating to enrich the mixture supplied by said carburettor, when said engine operating temperature is below said predetermined threshold, when said control input thereof senses a predetermined variation in the vacuum in said induction manifold.

5. In a spark ignition internal combustion engine having an exhaust emission control system including;

means for withdrawing a proportion of the exhaust gases from the exhaust manifold at a point corresponding to at least one cylinder and for recycling said exhaust gases to the carburetor, and means for admitting additional air directly into the exhaust manifold for the further combustion of any incompletely burnt fuel present in the exhaust gases in the exhaust system of said engine, the improvement wherein, said exhaust gas recycling means includes temperature sensitive valve means connected in circuit therewith, said temperature sensitive valve means being sensitive to the operating temperature of said engine and operating to prevent opening of said exhaust gas recycling valve means to effect recycling of exhaust gas except when the engine has attained a predetermined operating temperature, further valve means connected to a point in the induction manifold of said engine downstream from the carburetor butterfly valve, said further valve means including, means sensitive to the vacuum in said induction manifold, said further valve means operating to admit additional air to said induction manifold when said vacuum sensitive means thereof detects that the pressure in said induction manifold is below a threshold value, and temperature sensitive valve means operating to inhibit the admission of said additional air when the temperature of said engine is below a predetermined threshold value, control valve means connected in circuit with said further valve means, said control valve means being sensitive to energization of the starter motor of said engine and operating to close said further valve means when said starter motor is energized, whereby to prevent the admission of said additional air to said induction manifold when said engine is being started and thus to avoid the occurrence of explosions in the exhaust system due to said additional air, vacuum sensitive means for adjusting the ignition advance of the distributor of said engine, a duct connecting said vacuum sensitive means to a fourth point in said induction manifold, pneumatic delay valve means in said duct, and temperature sensitive valve means connected as a bypass valve across said pneumatic delay valve means, said temperature sensitive valve means opening to bypass said pneumatic delay valve means when the operating temperature of said engine is above a predetermined threshold and said pneumatic delay valve means operating, when said operating temperature of said engine is below said threshold, to delay signals to said vacuum sensitive mechanism by a predetermined delay whereby to delay adjustments to the ignition timing effected by said vacuum sensitive means.

* * * * *